US010715944B2

(12) United States Patent
Allen

(10) Patent No.: US 10,715,944 B2
(45) Date of Patent: Jul. 14, 2020

(54) AMBISONICS SOUND FIELD NAVIGATION USING DIRECTIONAL DECOMPOSITION AND PATH DISTANCE ESTIMATION

(71) Applicant: Google LLC, Mountain View, CA (US)

(72) Inventor: Andrew Allen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/189,400

(22) Filed: Nov. 13, 2018

(65) Prior Publication Data

US 2019/0373392 A1 Dec. 5, 2019

Related U.S. Application Data

(63) Continuation of application No. 15/647,741, filed on Jul. 12, 2017, now Pat. No. 10,182,303.

(51) Int. Cl.
*H04R 3/00* (2006.01)
*H04S 7/00* (2006.01)
(Continued)

(52) U.S. Cl.
CPC .............. *H04S 7/303* (2013.01); *G06F 3/011* (2013.01); *G06F 3/012* (2013.01); *G06F 3/038* (2013.01);
(Continued)

(58) Field of Classification Search
CPC . H04S 7/303; H04S 7/30; H04S 7/305; H04S 2400/15; H04S 2420/11; G06F 3/011; G06F 3/012; G06F 3/038; H04R 2430/20
See application file for complete search history.

(56) References Cited

U.S. PATENT DOCUMENTS 6,694,033 B1 2/2004 Rimell et al.
10,182,303 B1 * 1/2019 Allen ...................... G06F 3/011
(Continued)

OTHER PUBLICATIONS

Allen, et al, "Ambisonics sound field navigation using directional decomposition and path distance estimation", ICSA 2017 4th International Conference on Spatial Audio, Sep. 7-10, 2017, 6 pages.
(Continued)

*Primary Examiner* — Andrew L Sniezek
(74) *Attorney, Agent, or Firm* — Brake Hughes Bellermann LLP

(57) ABSTRACT

Techniques of rendering sound for a listener involve determining, at a first position, a set of directions from which some specified fraction of the sound field energy originates and reconstruct the sound field at a second position based on the set of directions. Along these lines, a sound rendering computer may receive sound data representing sound emanating from positions on a sphere centered on a microphone. Nevertheless, only a small fraction of these points on the sphere contribute much of the sound field energy directed at the listener. The sound rendering computer determines such directions using a directional decomposition in which those directions having the highest fraction of the sound energy are identified. When the listener moves away from the microphone's position, the sound rendering computer, after identifying such directions, applies an amplitude and phase factor to the sound fields corresponding to those directions.

28 Claims, 6 Drawing Sheets

(51) Int. Cl.
G06F 3/01 (2006.01)
G06F 3/038 (2013.01)

(52) U.S. Cl.
CPC ............... *H04S 7/30* (2013.01); *H04S 7/305* (2013.01); *H04R 2430/20* (2013.01); *H04S 2400/15* (2013.01); *H04S 2420/11* (2013.01)

(56) References Cited

U.S. PATENT DOCUMENTS

2013/0177168 A1 7/2013 Inha et al.
2015/0036848 A1 2/2015 Donaldson
2018/0046431 A1 2/2018 Morrell et al.

OTHER PUBLICATIONS

Baumgartner, "Time Domain Fast-Multipole Translation for Ambisonics", Diploma thesis, Jun. 8, 2011, 74 pages.

Southern, et al, "Rendering Walk-Through Auralisations Using Wave-Based Acoustical Models", 17th European Signal Processing Conference (EUSIPCO 2009), Aug. 24-28, 2009, 5 pages.

Tylka, et al, "Comparison of Techniques for Binaural Navigation of Higher-Order Ambisonic Soundfields", AES 139th Convention, Oct. 29-Nov. 1, 2015, 13 pages.

Tylka, et al, "Soundfield Navigation Using and Array of High-Order Ambisonics Microphones", AES Conference on Audio for Virtual and Augmented Reality, Sep. 30-Oct. 1, 2016, 10 pages.

Zotter, "Analysis and Synthesis of Sound-Radiation with Spherical Arrays", Dissertation, Institute of Electronic Music and Acoustics, University of Music and Performing Arts, Austria, Sep. 2009, 192 pages.

International Search Report and Written Opinion for International Application No. PCT/US2018/037696, dated Oct. 4, 2018, 16 pages.

Burraston, et al., "Limitations of Dynamically Controlling the Listening Position in a 3-D Ambisonic Environment", AES Convention, Mar. 22, 1997, 16 pages, XP055506915.

* cited by examiner

AMBISONICS SOUND FIELD NAVIGATION USING DIRECTIONAL DECOMPOSITION AND PATH DISTANCE ESTIMATION

CROSS-REFERENCE TO RELATED APPLICATION

This application is a Continuation of, and claims priority to, U.S. patent application Ser. No. 15/647,741, filed on Jul. 12, 2017, entitled "AMBISONICS SOUND FIELD NAVIGATION USING DIRECTIONAL DECOMPOSITION AND PATH DISTANCE ESTIMATION", the disclosure of which is incorporated by reference herein in its entirety.

TECHNICAL FIELD

This description relates to rendering of sound fields in virtual reality (VR) and similar environments.

BACKGROUND

Ambisonics is a full-sphere surround sound technique: in addition to the horizontal plane, it covers sound sources above and below the listener. Unlike other multichannel surround formats, its transmission channels do not carry speaker signals. Instead, they contain a speaker-independent representation of a sound field called B-format, which is then decoded to the listener's speaker setup. This extra step allows the producer to think in terms of source directions rather than in terms of directional signal positions, and offers the listener a considerable degree of flexibility as to the layout and number of speakers used for playback.

In ambisonics, an array of virtual directional signals surrounding a listener generates a sound field by decoding a sound file encoded in a scheme known as B-format from a sound source that is isotropically recorded. The sound field generated at the array of virtual directional signals can reproduce the effect of the sound source from any vantage point relative to the listener. Such decoding can be used in the delivery of audio through headphone speakers in Virtual Reality (VR) systems. Binaurally rendered high-order ambisonics (HOA) refers to the creation of many directional signals which combine to provide a pair of signals to left and right headphone speakers.

SUMMARY

In one general aspect, a method can include receiving, by controlling circuitry of a sound rendering computer configured to render sound fields for a listener, sound data resulting from a sound field produced by directional signal sources at a first position in space, each directional signal source producing a directional signal contributing to the sound field. The method can also include identifying, by the controlling circuitry, a plurality of directions of the directional signal sources based on the sound data, the plurality of directions being directions by which at least a specified fraction of energy of the sound field is produced at the first position. The method can further include obtaining, by the controlling circuitry, a plurality of distances of the directional signal sources from the first position in space. The method can further include generating, by the controlling circuitry, the sound field at a second position based on the plurality of directions and the plurality of distances, the second position being different from the first position.

The details of one or more implementations are set forth in the accompanying drawings and the description below. Other features will be apparent from the description and drawings, and from the claims.

DETAILED DESCRIPTION

Conventional approaches to rendering HOA sound fields involve placing the listener at the exact location at which the sound fields were recorded. Such conventional approaches induce reproduction error as the listener navigates away from the location of the recording. Further, the conventional navigation approaches poorly model sources in reflective environments.

In accordance with the implementations described herein and in contrast with the above-described conventional approaches to rendering HOA sound fields, improved techniques involve determining, at a first position, a set of directions from which some specified fraction of the sound field energy originates and reconstructing the sound field at a second position based on the set of directions. Along these lines, a sound rendering computer may receive sound data representing sound emanating from a plethora of positions on a sphere centered on a microphone. In some implementations, the sound data representing sound emanating from each point includes coefficients of a spherical harmonic representation of the sound field from that point. This sound field is the sound that a listener at the microphone's position may hear. Nevertheless, only a small fraction of these directional signals actually contribute much of the sound field energy directed at the listener. The sound rendering computer determines such directions using a directional decomposition in which those directions having the highest fraction of the sound energy are identified. When the listener moves away from the microphone's position, the sound rendering computer, after identifying such directions, applies an amplitude and phase factor to the sound fields corresponding to those directions. The sound rendering computer may also receive measurements of the distances of the directional signals from the microphone at those directions. Further, by constructing a similarity matrix of the directional signals, the sound rendering computer may determine whether the directional signals are direct sources of sound or reflections from another source of sound.

Advantageously, such a sound rendering computer may perform real-time updates to the sound field while taking reflections in a room into account. These real-time updates avoid either intense computational requirements of certain techniques and inaccuracies on others that may result in, for example, lowpass and directional errors.

Figure 1:
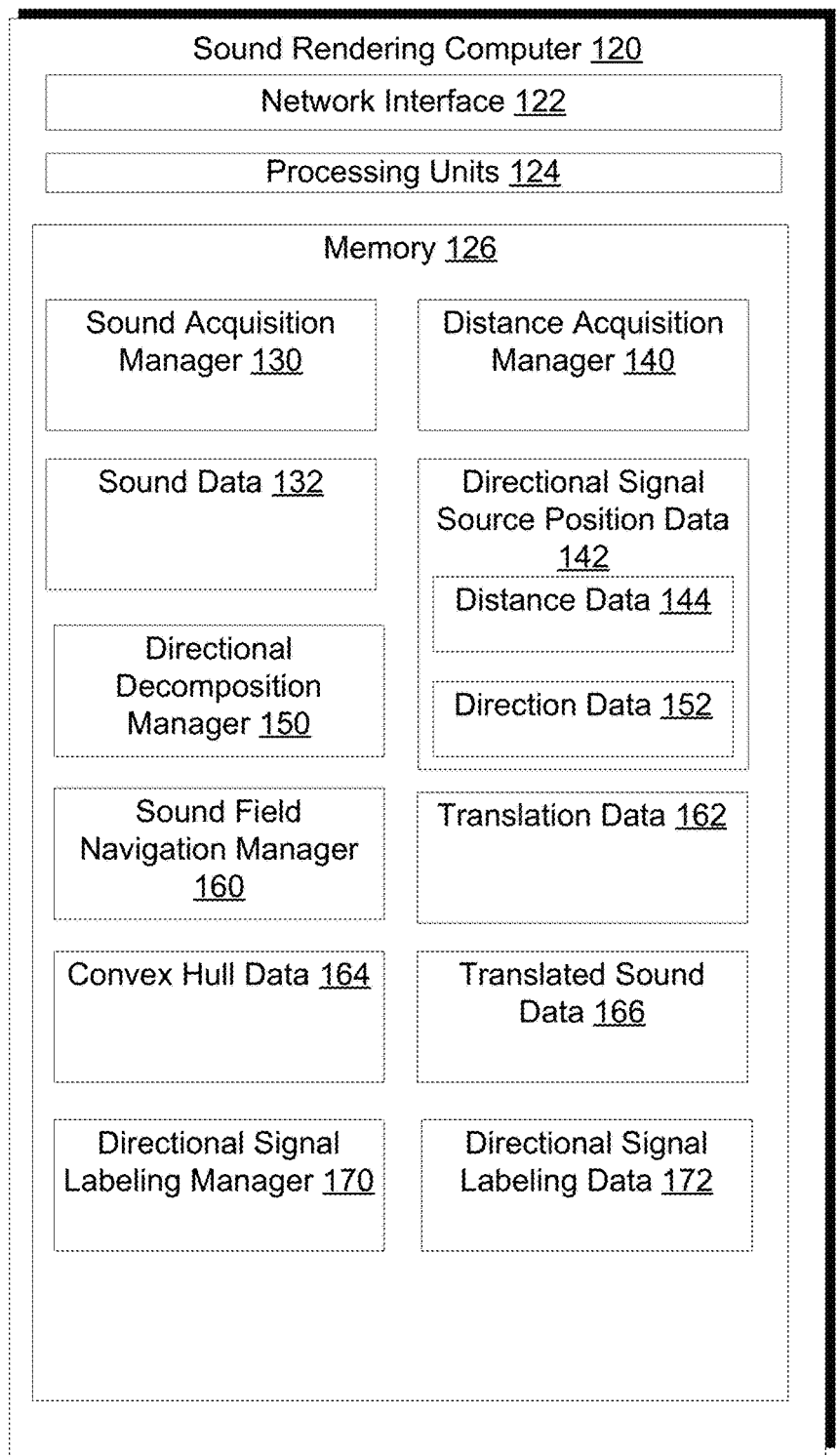
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes a sound rendering computer 120.

The sound rendering computer 120 is configured to render sound fields for a listener. The sound rendering computer 120 includes a network interface 122, one or more processing units 124, and memory 126. The network interface 122 includes, for example, Ethernet adaptors, Token Ring adaptors, and the like, for converting electronic and/or optical signals received from the network 170 to electronic form for use by the sound rendering computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the sound rendering computer 120 can be, or can include processors (e.g., processing units 124) configured to process instructions stored in the memory 126. Examples of such instructions as depicted in FIG. 1 include a sound acquisition manager 130, a distance acquisition manager 140, a directional decomposition manager 150, a sound field navigation manager 160, and a directional signal labeling manager 170. Further, as illustrated in FIG. 1, the memory 126 is configured to store various data, which is described with respect to the respective managers that use such data.

The sound acquisition manager 130 is configured to acquire sound data 132 from various sources. For example, the sound acquisition manager 130 may obtain the sound data 132 from an optical drive or over the network interface 122. Once it acquires the sound data 132, the sound acquisition manager is also configured to store the sound data 132 in memory 126. In some implementations, the sound acquisition manager 130 streams the sound data 132 over the network interface 122.

In some implementations, the sound data 132 is encoded in B-format, or first-order ambisonics with four components, or ambisonic channels. In some implementations, the sound data 132 is encoded in higher-order ambisonics, e.g., to order L. In this case, there will be $(L+1)^2$ ambisonic channels, each channel corresponding to a term in a spherical harmonic (SH) expansion of a sound field emanating from a directional signal source. In some implementations, the sound data 132 is represented as a matrix with each sample represented as a row and each HOA channel represented as a column.

The distance acquisition manager 140 can be configured to acquire distance data 144 for a selected set of points on the sphere. Such points can be included in the direction data 152 and determined via the directional decomposition manager 150. In some implementations, the distance data 144 can be acquired using a spherical camera.

The directional decomposition manager 150 can be configured to generate dominant directions, i.e., directional signal directions from which a specified fraction (e.g., 50%) of the sound field energy originates and store those directions in the direction data 152. The directional decomposition manager 150 can be configured to perform a directional decomposition operation on the sound data 132 to determine those directions. In some implementations, the directional decomposition manager 150 also can be configured to store the sound field data associated with the dominant directions in an array in order of sound energy fraction. The directional decomposition operation is discussed in further detail with regard to FIG. 2.

The sound field navigation manager 160 can be configured to generate corrections to the sound data 132, which can be expressed in translated sound data 166, given translations of a listener according to translation data 162. For example, when the listener moves away from the microphone position (i.e., the center of the sphere from which the direction data is measured), a tracking system may provide the translation data 162 at any given time. In response, the sound field navigation manager 160 may apply amplitude and phase corrections to the sound data along the various dominant directions included in the direction data 152 to produce a translated sound field as expressed in the translated sound data 166. In some implementations, the translated sound data 166 is represented as a SH expansion for each dominant direction. The amplitude and phase correction applied by the sound field navigation manager 160 is described in further detail with regard to FIG. 3.

In some implementations, there may be positions in space to which the listener navigates that may present difficulties for reproducing sound, i.e., the directional signals may not faithfully reproduce sounds in such positions. In some implementations, such positions may be determined by the convex hull of the directional signal source positions defined by the directional signal source position data 142 as shown in FIG. 1. In this case, the sound field navigation manager 160 is further configured to generate the convex hull of the directional signal source positions and store the convex hull as convex hull data 164. The sound field navigation manager 160 is then configured to determine whether a translation from the translation data 162 is inside or outside the convex hull represented in the convex hull data and, if it is outside, producing an indication that the sound field may not be accurately reproduced at the point defined by that translation.

The directional signal labeling manager 170 is configured to produce directional signal labeling data 172, which indicates whether a directional signal propagating at a particular direction is directly producing sound or is producing sound that results from a reflection of sound from another directional signal. The directional signal labeling manager 170 is configured to perform a directional signal labeling operation to produce the directional signal labeling data 172. In some implementations, the directional signal labeling operation involves performing a cross-correlation between sound fields from pairs of directions. In such a case, of the cross-correlation between a sound field resulting from a known, direct directional signal and another directional signal is greater than some threshold (e.g., 0.5), then the sound field from the other directional signal is considered to be a reflection of sound from the known, direct directional signal.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the sound rendering computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the sound rendering computer 120.

The components (e.g., modules, processing units 124) of the sound rendering computer 120 can be configured to operate based on one or more platforms (e.g., one or more similar or different platforms) that can include one or more types of hardware, software, firmware, operating systems, runtime libraries, and/or so forth. In some implementations, the components of the sound rendering computer 120 can be configured to operate within a cluster of devices (e.g., a server farm). In such an implementation, the functionality and processing of the components of the sound rendering computer 120 can be distributed to several devices of the cluster of devices.

The components of the sound rendering computer 120 can be, or can include, any type of hardware and/or software configured to process attributes. In some implementations, one or more portions of the components shown in the components of the sound rendering computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the sound rendering computer 120 can be, or can include, a software module configured for execution by at least one processor (not shown). In some implementations, the functionality of the components can be included in different modules and/or different components than those shown in FIG. 1.

Although not shown, in some implementations, the components of the sound rendering computer 120 (or portions thereof) can be configured to operate within, for example, a data center (e.g., a cloud computing environment), a computer system, one or more server/host devices, and/or so forth. In some implementations, the components of the sound rendering computer 120 (or portions thereof) can be configured to operate within a network. Thus, the components of the sound rendering computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the sound rendering computer 120 can be, or can include, processors configured to process instructions stored in a memory. For example, the sound acquisition manager 130 (and/or a portion thereof), the distance acquisition manager 140 (and/or a portion thereof), the directional decomposition manager 150 (and/or a portion thereof), the sound field navigation manager 160 (and/or a portion thereof), and the directional signal labeling manager 170 (and/or a portion thereof) can be a combination of a processor and a memory configured to execute instructions related to a process to implement one or more functions.

Figure 2:
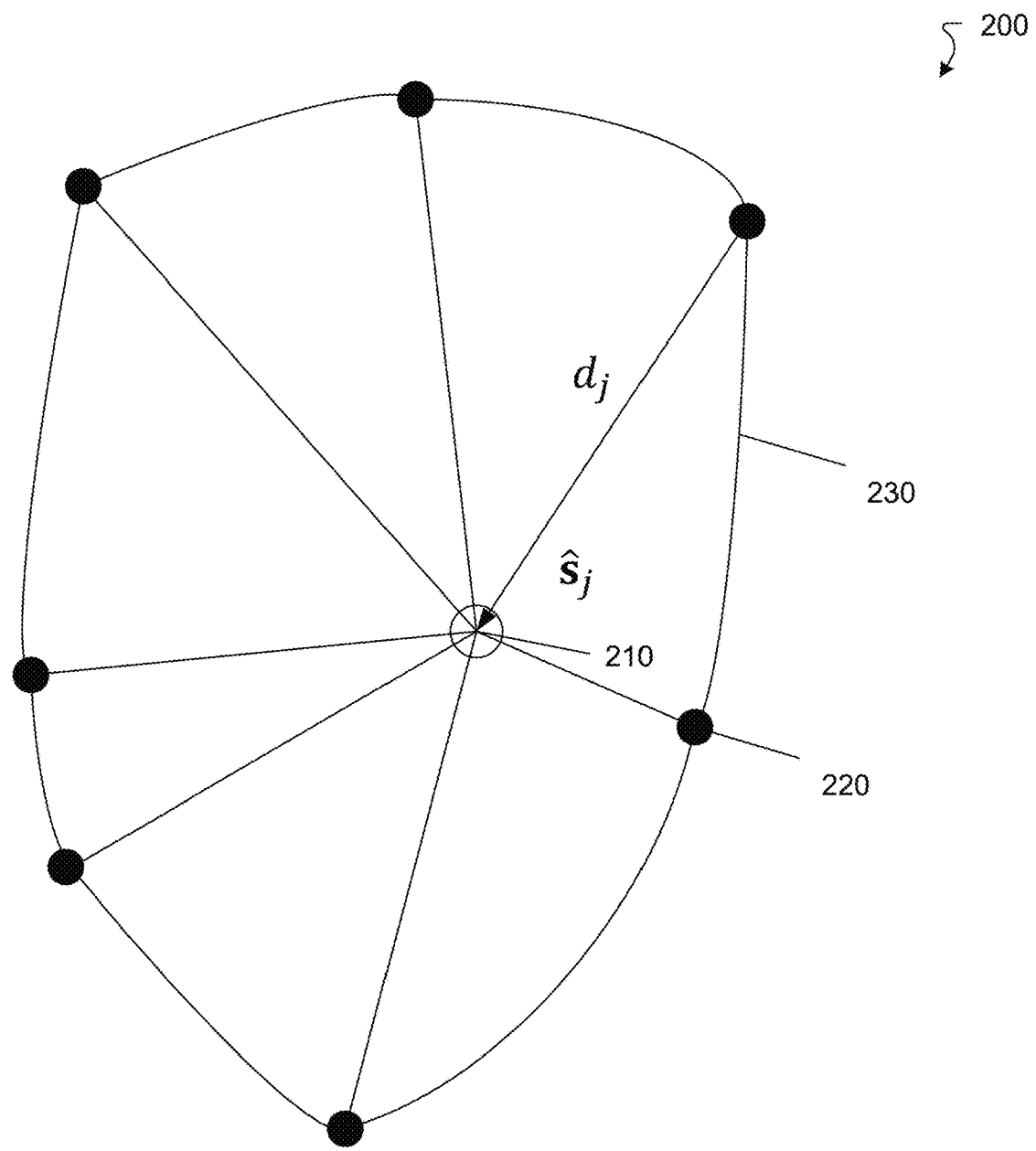
FIG. 2 is a diagram that illustrates example directional signal source directions and distances according to the improved techniques described herein.

FIG. 2 illustrates an example sound field environment 200 according to the improved techniques. Within this environment 200, there is a microphone 210 (open disk) at the center of a set of directional signal sources, e.g., directional signal source 220 (filled disks). Each directional signal source, e.g., the $j^{th}$, is a distance $d_j$ from the microphone 210 and at a direction $\hat{s}_j$.

The sound rendering computer 120 determines the directions of the directional signals, e.g., from directional signal source 220, from the sound data 132 using a directional decomposition operation. The directional decomposition operation involves defining the sound data 132 as a matrix b having, as rows, coefficients of a SH expansion of the sound field from M samples with the microphone 210 at the center and, as columns, the channels of the SH expansion. For example, $$b = \begin{pmatrix} b_{0,0}^{(1)} & b_{0,0}^{(2)} & \cdots & b_{0,0}^{(M)} \\ b_{1,-1}^{(1)} & b_{1,-1}^{(2)} & \cdots & b_{1,-1}^{(M)} \\ \vdots & \vdots & \ddots & \vdots \\ b_{N,N}^{(1)} & b_{N,N}^{(2)} & \cdots & b_{N,N}^{(M)} \end{pmatrix},$$

where $b_{m,n}^{(j)}$ is the coefficient of $Y_n^m(\theta_j, \phi_j)$, the (m, n) SH with $n \in \{0, \ldots, N\}$ and $m \in \{-n, \ldots, n\}$. Along these lines, for 1 second of audio at 8 kHz sample, when N=1 b has 4 rows and, e.g., 8000 columns for 8000 samples.

The directional decomposition operation takes the form of a recursion involving a residual matrix r having an initial value b and a matrix Y of spherical harmonics $Y_n^m(\theta_j, \phi_j)$ for each point on the sphere. In some implementations, the directional decomposition operation includes the following procedure:

while $\|r\| > \varepsilon \|b\|$ {
    j=argmax ($\|\text{column}(rY^T,k)\|$, k);
    $S_j = rY_j^T$;
    $r = r - S_j Y_j^*$;
    S=append(S, $S_j$);
    J=append(J,j);
    E=append(E,$Y_j$)} where argmax (•, k) is the index over the range of k in which the value of the first argument is a maximum, $\|\text{column}(rY^T, k)\|$ is the norm of the $k^{th}$ column of the matrix $rY^T$, $Y_j^T$ is the transpose of the $j^{th}$ column of Y, $Y_j$ is the $j^{th}$ column of Y, $Y_j^*$ is the complex conjugate of the $j^{th}$ column of Y, $\varepsilon$ is a specified tolerance, S is a matrix whose columns are sound fields at the microphone from the dominant directions, $S_j$ is the $j^{th}$ column of S, J is a vector of column indices corresponding to the dominant directions, and E is a matrix whose columns are the spherical harmonics in the dominant directions. Accordingly, b=SE+r. It is assumed that the residual r is sufficiently ambient in content so that r is independent of translations. In some implementations, the norms are Frobenius norms, i.e., sums of the squares of the elements of the matrices.

In FIG. 2, the sound field includes simple monopole sources, so that the sound field at the sources $X_j$ along the direction $\hat{s}_j(\theta_j, \phi_j)$ may be determined via a Green's function as follows:

$$S_j = \frac{e^{ikd_j}}{d_j} X_j,$$

where k is a wavenumber.

Figure 3:
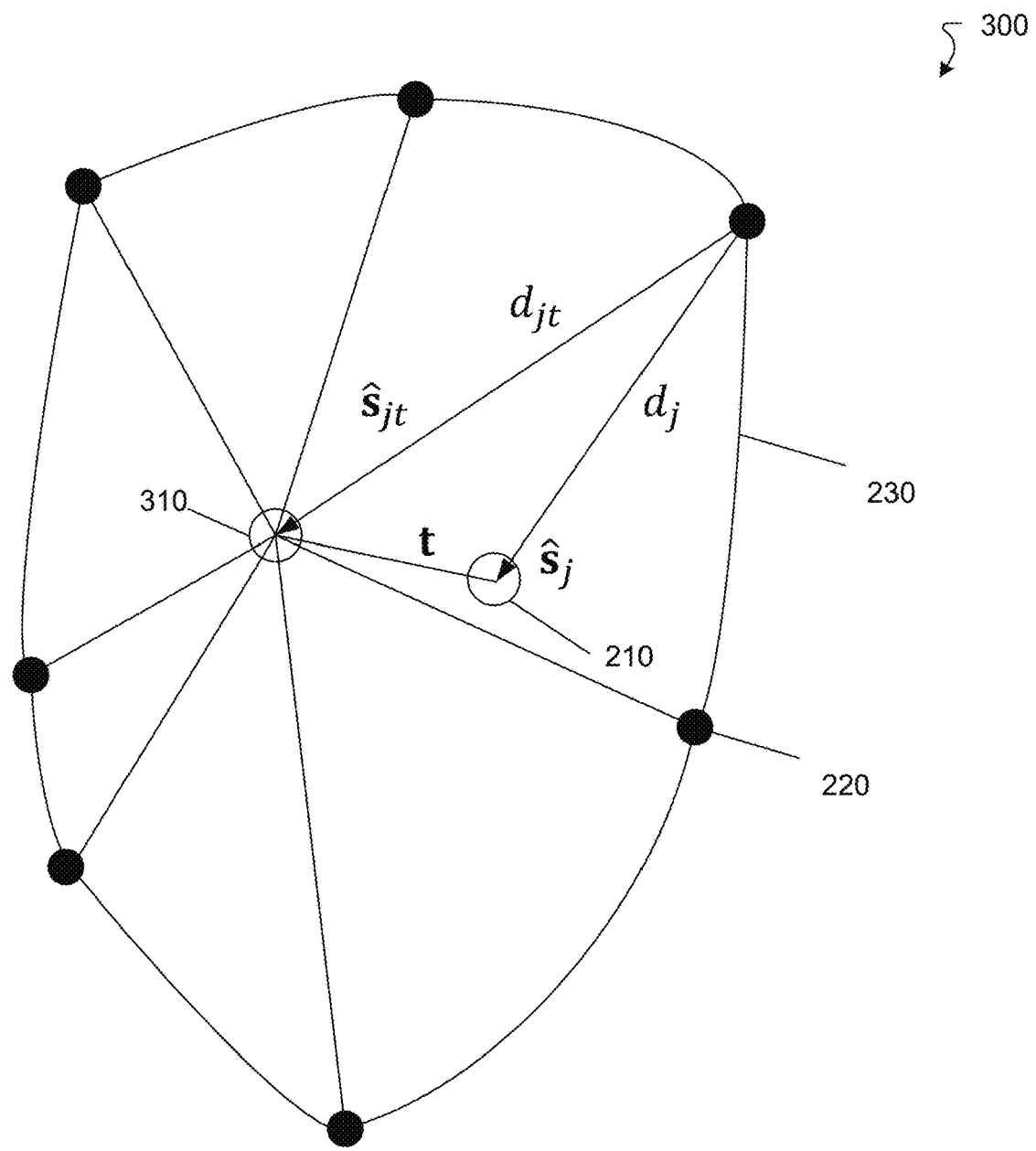
FIG. 3 is a diagram that illustrates example directional signal source directions and distances during sound field navigation according to the improved techniques described herein.

FIG. 3 illustrates an example sound field $b_t$ at a position 310 translated from the microphone to a position t. Upon such a translation, the sound field navigation manager 160 generates the distances $d_{jt}$ from the translated position to the $j^{th}$ directional signal source, e.g., directional signal source 220. The sound field navigation manager 160 then computes sound field at this translated position 310 from the $j^{th}$ directional signal, e.g., from directional signal source 220 $(S_t)_j$ according to the following equation:

$$(S_t)_j = \frac{d_{jt}}{d_j} e^{ik(d_j - d_{jt})} S_j.$$

Because the residual is assumed independent of translation, we may also write the following relation for the sound field at the translation point:

$$b_t = S_t E_t + r,$$

where $E_t$ is the encoding matrix of translated spherical harmonics.

In some implementations, the sound field navigation manager 160 determines whether the translation point 310 is inside or outside the convex hull 230 defined by the directional signal sources, e.g., directional signal source 220. In some implementations, if the sound field navigation manager 160 determines whether the translation point 310 is outside of the convex hull 230, then the sound field navigation manager 160 may return an indication that the sound field at the translation point is inaccurately rendered. Nevertheless, in some implementations, the sound field at a translation point outside of the convex hull 230 may be accurately rendered with a sufficient number of directional signal sources.

Figure 4:
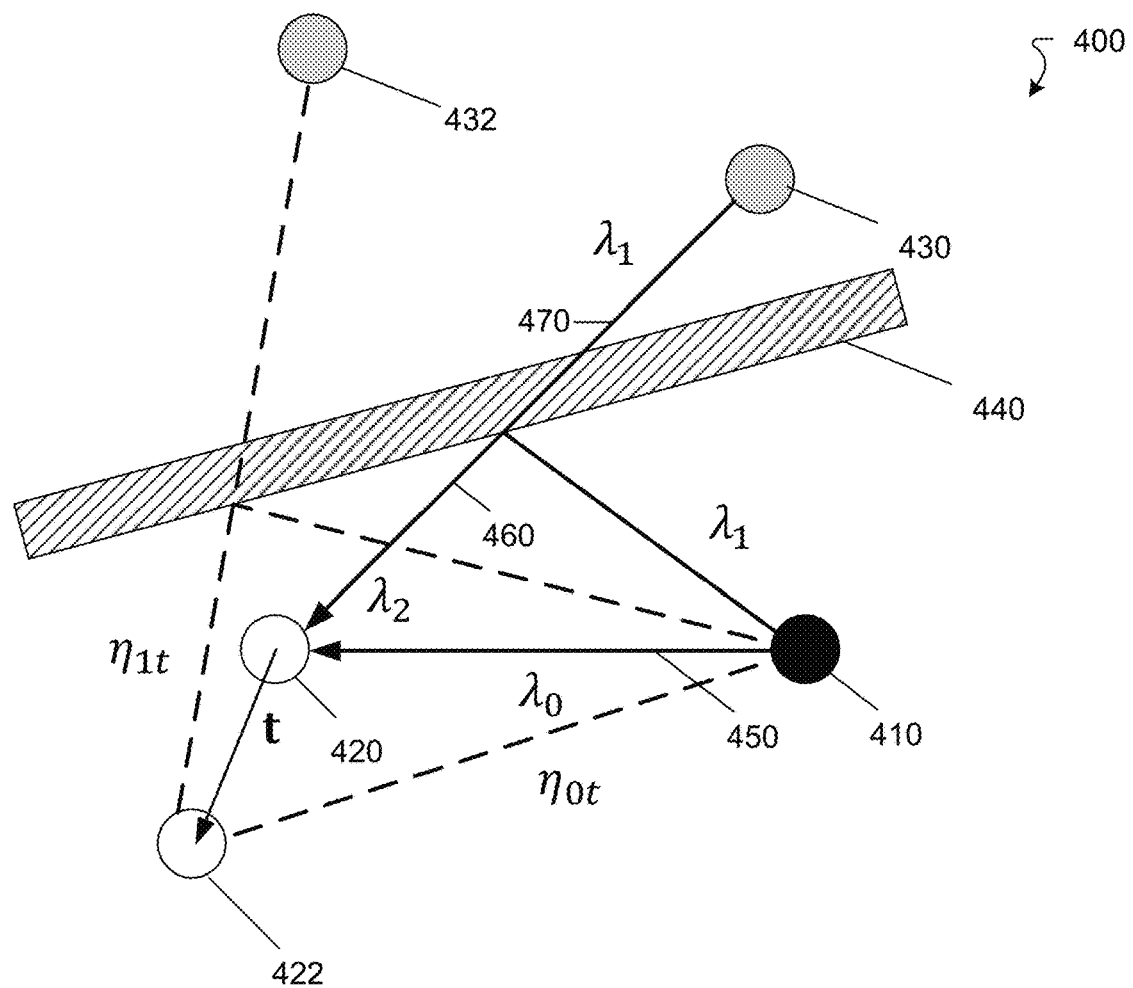
FIG. 4 is a diagram that illustrates an example sound field navigation with reflections in a room according to the improved techniques described herein.

FIG. 4 is a diagram illustrating an example sound field at a microphone position 420 with respect to a source position 410 in a room with a wall 440. In such a scenario, the monopole source approach illustrated above is insufficient. Rather, it is assumed that, under certain conditions, the sound field at the point 420 from the source 410 is a sum of contributions over a direct path 450 (i.e., without reflection) a distance $\lambda_0$ and a reflected path 460 a distance $\lambda_1 + \lambda_2$. In some implementations, the wall 440 is assumed to be a perfect reflector, although this is by no means a requirement. When the wall is a perfect reflector, the reflected path can be considered to come directly from a phantom source 430 over the same distance. For multiple reflections, there can be multiple phantom sources.

FIG. 4 also illustrates an example scenario in which the listener is translated to the position 422, with a corresponding phantom source 432. The direct path in this case has a length $\eta_{0t}$ and the reflected (phantom) path has a length $\eta_{1t}$. The sound field navigation manager 160 computes these path lengths given the translation t.

The sound field navigation manager 160 may then generate the reflected sound field for a translated listener $S_j^{refl}$ according to the following relation:

$$S_j^{refl} = \frac{\eta_j}{\eta_{jt}} e^{ik(d_{jt} - d_j)} S_j,$$

where $\eta_j = d_j + \mu_j$, where $\mu_j$ is the sum of all phantom paths of $S_j$, and $\eta_{jt}$ is the translated distance from the phantom source.

The conditions under which a reflection is assumed is described as follows. The matrix S has, as columns, sound field contributions from each source at the directions determined by the directional decomposition operation detailed above. It is assumed that, if a first column corresponds to a source for which there are no reflections (i.e., a direct source), then if a cross-correlation of that column with a second column is greater than a specified threshold (e.g., 0.5), then the second column represents a reflected sound field. In some implementations, the cross-correlation p takes the form $$\rho = \sum_{n=1}^{(N+1)^2} \left| \sum_{i=1}^{(N+1)^2 - n} S_i^{(p)} S_{i+n}^{(q)*} \right|,$$

where $S_i^{(p)}$ is the element of S in the ith row and $p^{th}$ column, and q>p.

More generally, the directional signal labeling manager 170 is configured to construct a similarity matrix that includes, as elements, similarity measures that indicate a degree of similarity between directional signals. The above-described cross-correlation is but one example of such a similarity measure. Such similarity measures may be clustered according to a spectral clustering or affinity propagation procedure to identify whether a directional signal is a direct signal or a reflected signal.

To estimate the quantity $\mu_j$, the sound field navigation manager 160 computes the above cross-correlation ρ where, e.g., q=j. If ρ is less than the specified threshold (e.g., 0.5), then the sound field navigation manager 160 sets $\mu_j = 0$. If ρ is greater than the specified threshold, then the sound field navigation manager 160 compares the $j^{th}$ sound field with the earlier, e.g., $p^{th}$ sound field and computes a complex-valued scalar that best-fits $S_j^{refl}$ to $S_j$ via a least-squares solution. For example, defines $\alpha = S \cdot (S^{refl})^{-1}$, a where the inverse is a pseudoinverse. The sound field navigation manager 160 may determine the distances $\mu_j$ from the quantity a assuming the above relation for the reflected sound field is true.

Figure 5:
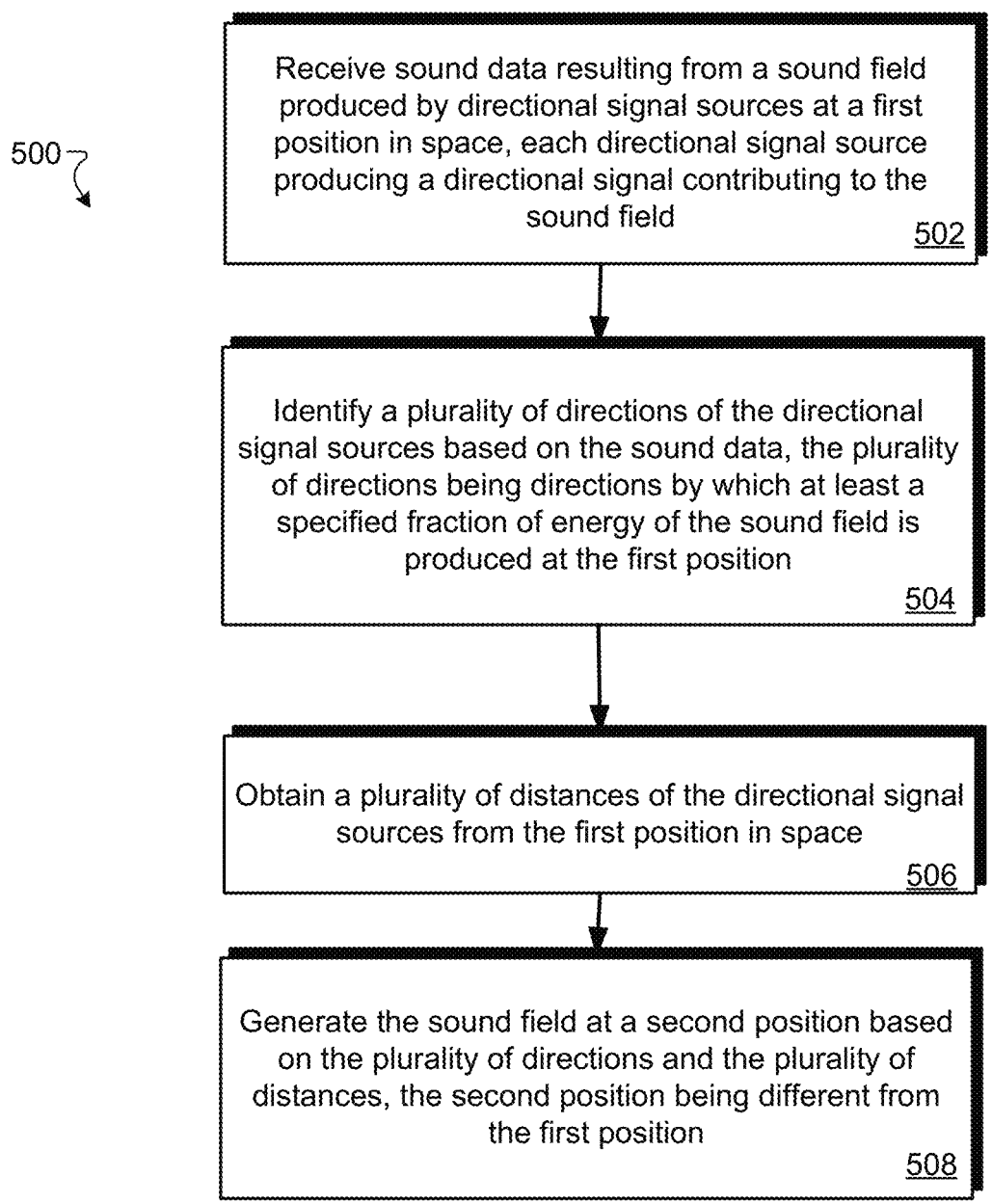
FIG. 5 is a flow chart that illustrates an example method of performing the improved techniques within the electronic environment shown in FIG. 1.

FIG. 5 is a flow chart that illustrates an example method 500 of performing binaural rendering of sound. The method 500 may be performed by software constructs described in connection with FIG. 1, which reside in memory 126 of the sound rendering computer 120 and are run by the set of processing units 124.

At 502, controlling circuitry of a sound rendering computer configured to render sound fields for a listener receives sound data resulting from a sound field produced at a first position in space.

At 504, the controlling circuitry identifies a plurality of directions of directional signals based on the sound data, the plurality of directions being directions by which at least a specified fraction of energy of the sound field is produced at the first position.

At 506, the controlling circuitry obtains a plurality of distances of the directional signal sources from the first position in space.

At 508, the controlling circuitry generates the sound field at a second position based on the plurality of directions and the plurality of distances, the second position being different from the first position.

Figure 6:
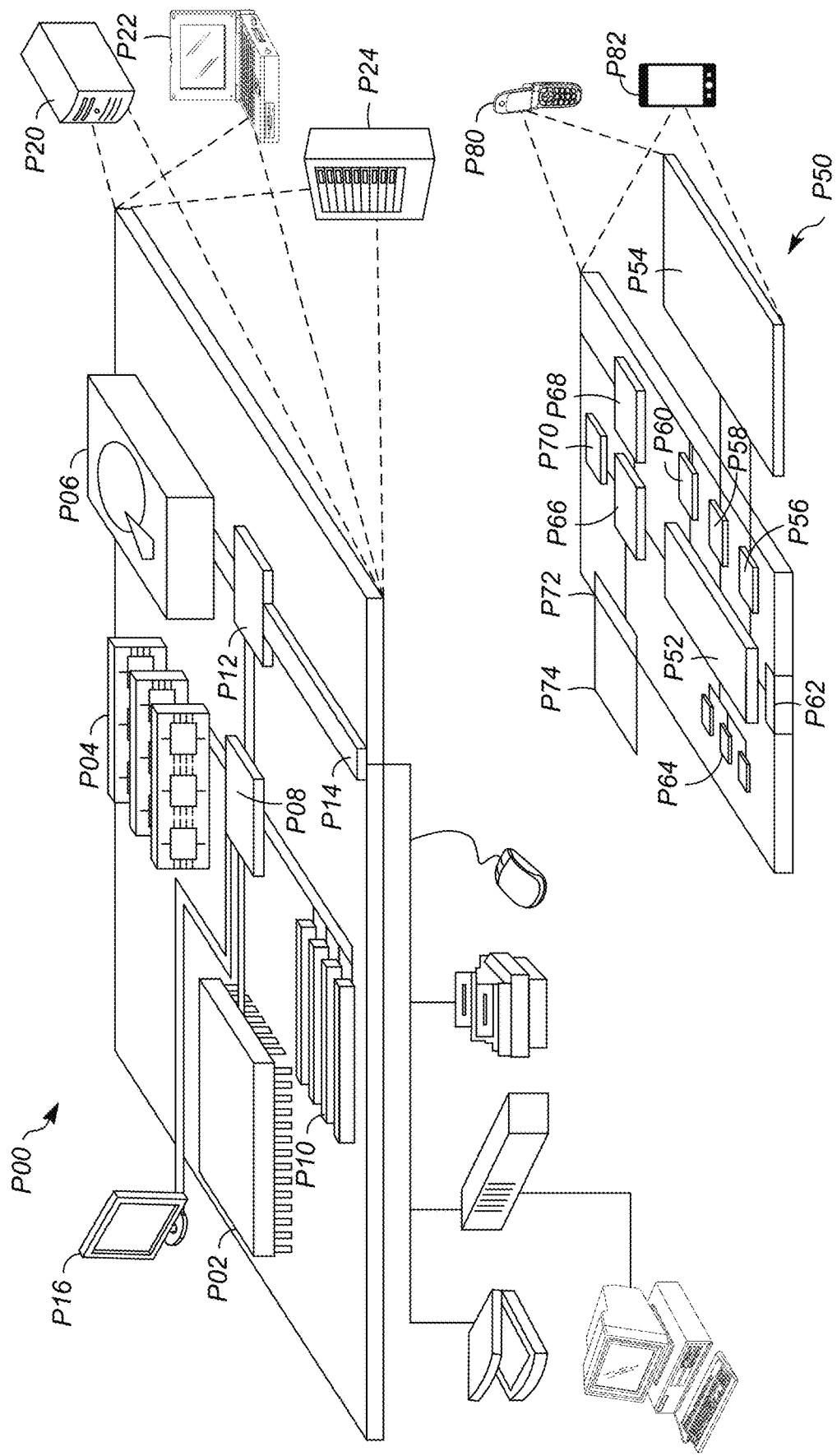
FIG. 6 illustrates an example of a computer device and a mobile computer device that can be used with circuits described here.

FIG. 6 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or"

are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A computer program product comprising a non-transitory computer-readable medium, the computer program product including code that, when executed by processing circuitry of a sound rendering computer configured to render sound fields for a listener, causes the processing circuitry to perform a method, the method comprising:
   receiving sound data resulting from a first sound field produced by directional signal sources at a first position in space each directional signal source producing a directional signal contributing to the sound field, wherein the sound data includes a first matrix, elements of the first matrix including coefficients of a spherical harmonic expansion of the sound field at a plurality of points on a unit sphere having a center corresponding to the first position;
   obtaining a plurality of directions of the directional signal sources based on the sound data;
   obtaining a plurality of distances of the directional signal sources from the first position in space; and
   generating based on the sound data, the plurality of directions, and the plurality of distances, a second sound field for a second position, the second position corresponding to a location different from the center of the unit sphere.

2. The computer program product as in claim 1, wherein the sound data is encoded in higher-order ambisonics to an order L, where L is greater than or equal to 2.

3. The computer program product as in claim 1, wherein L is greater than or equal to 4.

4. The computer program product as in claim 1, the method further comprising rendering the second sound field for a listener through a plurality of speakers available to the listener.

5. The computer program product as in claim 1, wherein obtaining the plurality of directions includes:
   generating a second matrix, the second matrix having as elements spherical harmonic terms evaluated at the plurality of points on the unit sphere;
   multiplying the first matrix and the second matrix to produce a third matrix, each column of the third matrix corresponding to a point of the plurality of points on the unit sphere and representing the sound field at the point of the plurality of points on the unit sphere; and
   obtaining, as a direction of the plurality of directions, a point of the plurality of points on the unit sphere corresponding to a column of the third matrix, the column of the third matrix having a maximum value of a vector norm of the columns of the third matrix.

6. The computer program product as in claim 5, wherein the vector norm is a Frobenius norm.

7. The computer program product as in claim 5, wherein identifying the plurality of directions further includes:
   multiplying the column of the third matrix and a transpose of the second matrix to produce a fourth matrix;
   subtracting the fourth matrix from the first matrix to produce a residual matrix; and
   identifying, as a second direction of the plurality of directions, a point of the plurality of points on the unit sphere corresponding to a column of a fifth matrix formed by multiplying the residual matrix and the second matrix, the column of the fifth matrix having a maximum value of a vector norm of the columns of the fifth matrix.

8. The computer program product as in claim 1, wherein the first sound field is received in a room with walls, and further comprising:
   for each of the plurality of directions of the directional signal sources, performing a directional signal labeling operation to produce an indication whether a directional signal produced by the directional signal source having that direction is a result of a reflection of sound of another directional signal off of a wall of the room.

9. The computer program product as in claim 8, wherein performing the directional signal labeling operation for each of the plurality of directions includes:
   performing a cross-correlation operation on a first sound field at a first direction of the plurality of directions and a second sound field at a second direction of the plurality of directions to produce a cross-correlation result, the first sound field being a direct sound field in which the first sound field is the result of a directional signal produced by a directional signal source at the first direction at a distance of the plurality of distances;
   in response to the cross-correlation result being smaller than a threshold, producing a first indicator indicating that the second sound field is a direct sound field; and
   in response to the cross-correlation result being greater than the threshold, producing a second indicator indicating that the second sound field is a result of a reflection of another directional signal off of a wall of the room.

10. The computer program product as in claim 1, wherein generating the second sound field includes, for each of the plurality of directions, multiplying a sound field at that direction by an amplitude factor and a phase factor, a phase of the phase factor being based on a difference between the distance from the second position in space to the directional signal source at that direction and the distance from the first position in space to the directional signal source at that direction.

11. The computer program product as in claim 10, wherein multiplying the sound field at each of the set of directions by an amplitude factor includes:
   in response to the directional signal source having that direction being a direct source, setting the amplitude factor to be a ratio of the distance from the second position in space to the directional signal source having that direction to the distance from the first position in space to the directional signal source having that direction; and
   in response to the directional signal having that direction being a result of a reflection, setting the amplitude factor to be a ratio of a sum of distances from the second position in space to a phantom source at that direction to a sum of distances from the first position in space to the phantom source at that direction.

12. The computer program product as in claim 1, wherein obtaining the plurality of distances of the virtual directional signal sources from the first position in space includes receiving the plurality of distances from a spherical camera.

13. The computer program product as in claim 1, the method further comprising:
  generating a convex hull from the plurality of directions and the plurality of distances of the virtual directional signal sources; and
  wherein generating the sound field at the second position includes:
    determining whether the second position is outside of the convex hull; and
    in response to the second position being outside of the convex hull, returning an indication that the sound field may not be accurately reproduced at the second position.

14. The computer program product as in claim 1, wherein the plurality of directions include directions by which at least a specified fraction of energy of the sound field is produced at the first position.

15. An electronic apparatus configured to render sound fields for a listener, the electronic apparatus comprising:
  memory; and
  controlling circuitry coupled to the memory, the controlling circuitry being configured to:
    receive sound data resulting from a first sound field produced by directional signal sources at a first position in space, each directional signal source producing a directional signal contributing to the sound field, wherein the sound data includes a first matrix, elements of the first matrix including coefficients of a spherical harmonic expansion of the sound field at a plurality of points on a unit sphere having a center corresponding to the first position;
    obtain a plurality of directions of the directional signal sources based on the sound data;
    obtain a plurality of distances of the directional signal sources from the first position in space; and
    generate based on the sound data, the plurality of directions, and the plurality of distances, a second sound field for a second position, the second position corresponding to a location different from the center of the unit sphere.

16. The electronic apparatus as in claim 15, wherein the sound data is encoded in higher-order ambisonics to an order L, where L is greater than 2.

17. The electronic apparatus as in claim 15, wherein L is greater than or equal to 4.

18. The electronic apparatus as in claim 15, the controlling circuitry being further configured to render the second sound field for a listener through a plurality of speakers available to the listener.

19. The electronic apparatus as in claim 15, wherein obtaining the plurality of directions includes:
  generating a second matrix, the second matrix having as elements spherical harmonic terms evaluated at the plurality of points on the unit sphere;
  multiplying the first matrix and the second matrix to produce a third matrix, each column of the third matrix corresponding to a point of the plurality of points on the unit sphere and representing the sound field at the point of the plurality of points on the unit sphere; and
  obtaining, as a direction of the plurality of directions, a point of the plurality of points on the unit sphere corresponding to a column of the third matrix, the column of the third matrix having a maximum value of a vector norm of the columns of the third matrix.

20. The electronic apparatus as in claim 19, wherein the vector norm is a Frobenius norm.

21. The electronic apparatus as in claim 19, wherein identifying the plurality of directions further includes:
  multiplying the column of the third matrix and a transpose of the second matrix to produce a fourth matrix;
  subtracting the fourth matrix from the first matrix to produce a residual matrix; and
  identifying, as a second direction of the plurality of directions, a point of the plurality of points on the unit sphere corresponding to a column of a fifth matrix formed by multiplying the residual matrix and the second matrix, the column of the fifth matrix having a maximum value of a vector norm of the columns of the fifth matrix.

22. The electronic apparatus as in claim 15, wherein the first sound field is received in a room with walls, and the controlling circuitry being further configured to:
  for each of the plurality of directions of the directional signal sources, perform a directional signal labeling operation to produce an indication whether a directional signal produced by the directional signal source having that direction is a result of a reflection of sound of another directional signal off of a wall of the room.

23. The electronic apparatus as in claim 22, wherein performing the directional signal labeling operation for each of the plurality of directions includes:
  performing a cross-correlation operation on a first sound field at a first direction of the plurality of directions and a second sound field at a second direction of the plurality of directions to produce a cross-correlation result, the first sound field being a direct sound field in which the first sound field is the result of a directional signal produced by a directional signal source at the first direction at a distance of the plurality of distances;
  in response to the cross-correlation result being smaller than a threshold, producing a first indicator indicating that the second sound field is a direct sound field; and
  in response to the cross-correlation result being greater than the threshold, producing a second indicator indicating that the second sound field is a result of a reflection of another directional signal off of a wall of the room.

24. The electronic apparatus as in claim 15, wherein generating the second sound field includes, for each of the plurality of directions, multiplying a sound field at that direction by an amplitude factor and a phase factor, a phase of the phase factor being based on a difference between the distance from the second position in space to the directional signal source at that direction and the distance from the first position in space to the directional signal source at that direction.

25. The electronic apparatus as in claim 24, wherein multiplying the sound field at each of the set of directions by an amplitude factor includes:
  in response to the directional signal source having that direction being a direct source, setting the amplitude factor to be a ratio of the distance from the second position in space to the directional signal source having that direction to the distance from the first position in space to the directional signal source having that direction; and
  in response to the directional signal having that direction being a result of a reflection, setting the amplitude factor to be a ratio of a sum of distances from the second position in space to a phantom source at that direction to a sum of distances from the first position in space to the phantom source at that direction.

26. The electronic apparatus as in claim 15, wherein obtaining the plurality of distances of the virtual directional signal sources from the first position in space includes receiving the plurality of distances from a spherical camera.

27. The electronic apparatus as in claim 15, the controlling circuitry being further configured to:
- generate a convex hull from the plurality of directions and the plurality of distances of the virtual directional signal sources; and
- wherein generating the sound field at the second position includes:
  - determining whether the second position is outside of the convex hull; and
  - in response to the second position being outside of the convex hull, returning an indication that the sound field may not be accurately reproduced at the second position.

28. The electronic apparatus as in claim 15, wherein the plurality of directions include directions by which at least a specified fraction of energy of the sound field is produced at the first position.

* * * * *